(12) United States Patent
Walker-McLaughlin et al.

(10) Patent No.: US 12,219,971 B2
(45) Date of Patent: Feb. 11, 2025

(54) BULK MELT-TO-MAKE PECTIN-BASED GUMMY MIX PRECURSOR AND METHODS OF MAKING AND USING

(71) Applicant: M2M Gummies, LLC, Northampton, MA (US)

(72) Inventors: Sarah C. Walker-McLaughlin, Peterborough, NH (US); Siyue Gao, Amherst, MA (US)

(73) Assignee: M2M Gummies, LLC, Northampton, MA (US)

( * ) Notice: Subject to any disclaimer, the term of this patent is extended or adjusted under 35 U.S.C. 154(b) by 72 days.

(21) Appl. No.: 17/932,085

(22) Filed: Sep. 14, 2022

(65) Prior Publication Data

US 2023/0078869 A1  Mar. 16, 2023

Related U.S. Application Data

(60) Provisional application No. 63/244,082, filed on Sep. 14, 2021.

(51) Int. Cl.
| | |
|---|---|
| A23G 3/42 | (2006.01) |
| A23G 3/34 | (2006.01) |
| A23G 3/36 | (2006.01) |

(52) U.S. Cl.
CPC ............. *A23G 3/42* (2013.01); *A23G 3/0053* (2013.01); *A23G 3/362* (2013.01); *A23V 2002/00* (2013.01)

(58) Field of Classification Search
None
See application file for complete search history.

(56) References Cited

U.S. PATENT DOCUMENTS

| | | | |
|---|---|---|---|
| 2014/0127375 A1 | 5/2014 | Cao et al. | |
| 2017/0360865 A1 | 12/2017 | Villagran et al. | |
| 2018/0168182 A1 | 6/2018 | Majeed et al. | |
| 2018/0289032 A1 | 10/2018 | Dick et al. | |
| 2020/0038335 A1 | 2/2020 | Dick et al. | |
| 2020/0138705 A1 | 5/2020 | Wan et al. | |

FOREIGN PATENT DOCUMENTS

| | | | | |
|---|---|---|---|---|
| WO | WO-2012017054 A1 * | 2/2012 | ........... | A23G 3/0025 |
| WO | 2012136454 A1 | 10/2012 | | |
| WO | WO-2018206695 A1 * | 11/2018 | | |
| WO | 2022226487 A1 | 10/2022 | | |
| WO | 2023044322 A1 | 3/2023 | | |

OTHER PUBLICATIONS

Notification of Transmittal of the International Search Report and the Written Opinion of the International Searching Authority, or the Declaration for International Application No. PCT/US2022/076397, "Bulk Melt-to-Make Pectin-based Gummy Mix Precursor and Methods of Making and Using" date of mailing: Dec. 7, 2022.

Poppe, J., "New Approaches to Gelling Agents in Confectionery", the Manufacturing Confection, Chicago, IL, US, vol. 75(5). May 1, 1995, pp. 119-126.

International Preliminary Report on Patentability for International Application No. PCT/US2022/076397, "Bulk Melt-to-Make Pectin-based Gummy Mix Precursor and Methods of Making and Using" date of issuance: Mar. 5, 2024.

* cited by examiner

Primary Examiner — Jyoti Chawla
(74) Attorney, Agent, or Firm — Hamilton, Brook, Smith & Reynolds, P.C.

(57) ABSTRACT

Pectin-based melt-to-make bulk gummy mix is disclosed that is shelf stable and formulated, optionally with flavors and colors, in a bulk mix form that is convenient for the next step in manufacturing individual serving pectin gummies. The bulk pectin-based gummy mix can be formulated by companies making infused gummies in a convenient manner to consistently manufacture pectin-based gummies in any size and dose. Methods for making a storage stable bulk pectin-based gummy mix that is a precursor for making individual serving pectin gummies are disclosed, as well as methods for making individual serving pectin gummies from a storage stable bulk pectin-based gummy mix. Kits comprising a two-part pectin-based gummy mix and acidulent for initiating pectin gelling are also described for the convenient manufacture of individual serving pectin-based gummies.

20 Claims, No Drawings

BULK MELT-TO-MAKE PECTIN-BASED GUMMY MIX PRECURSOR AND METHODS OF MAKING AND USING

RELATED APPLICATIONS

This application claims the benefit of U.S. Provisional Application No. 63/244,082, filed on Sep. 14, 2021. The entire teachings of the above application(s) are incorporated herein by reference.

BACKGROUND

Pectin-based gummies are a popular option for infused products but can be difficult to manufacture. There is a need for a quick and easy option for companies wishing to make infused pectin-based gummies that can be consistently and uniformly made.

SUMMARY

The disclosure is based on the discovery of a pectin-based melt-to-make bulk gummy mix that is shelf stable and formulated, optionally with flavors and colors, in a bulk mix form that is convenient for the next step in manufacturing individual serving pectin gummies. The bulk pectin-based gummy mix can be formulated by companies making infused gummies in a convenient manner to consistently manufacture pectin-based gummies in any size and dose. Methods for making a storage stable bulk pectin-based gummy mix that is a precursor for making individual serving pectin gummies are disclosed, as well as methods for making individual serving pectin gummies from a storage stable bulk pectin-based gummy mix. Kits comprising a two-part pectin-based gummy mix and acidulent for initiating pectin gelling are also described for the convenient manufacture of individual serving pectin-based gummies.

DETAILED DESCRIPTION

A description of example embodiments follows.
Methods of Making a Storage Stable Melt-to-Make Bulk Pectin-Based Gummy Mix In one aspect, the disclosure pertains to methods of making a storage stable bulk pectin-based gummy mix that is a precursor for making individual serving pectin gummies. The bulk pectin-based gummy mix is a precursor because it is provided as a viscous, almost solid mixture that does not gel at room temperature. The bulk pectin-based gummy mix has a sugar level, as measured by Brix, below the target Brix level of the final gelling gummy melt. This allows the bulk pectin-based gummy mix to be melted in the next step of the process of making individual serving pectin-based gummies. During the melting process, the Brix level of the gummy mix is increased due to evaporation of the water in the melt, to achieve the final desired Brix of the gelling gummy melt. Once the target Brix of the melt is achieved, acidulant solution is added and the melt is ready to be deposited into molds for the individual serving gummies.

A first step in a method of making a bulk pectin-based gummy mix comprises heating a mix comprising pectin, sugars and buffering salt in water in a heated kettle with a cover to control water evaporation and heat up the mixture sufficiently. The heating should proceed for a period of time sufficient for the pectin to fully be dissolved (by visually inspecting the mixture to be free of clumps). The percentages of the base ingredients (e.g., pectin, water, sugars, buffering salt) are described below, with slight variations in these ratios to account for the addition of flavorings and coloring ingredients into the pectin mix. In an embodiment, the pectin, sugar and buffering salt are provided as a dry mix that is hydrated in water. In another embodiment, the pectin is provided in liquid form.

All or a portion of the water can be replaced with fruit juice or fresh fruit-derived products. Adjustments to Brix and pH may need to be adjusted. Such adjustments can be readily determined by the skilled person in view of the teachings herein.

Buffering salt as used herein refers to an edible salt that can buffer the pectin-based gummy mix to a desired pH level when the organic acid (acidulant) is added to the pectin-based gummy mix, to initiate the gelling process. Suitable buffering salts include but are not limited to sodium citrate, sodium bicarbonate, sodium tartrate, potassium tartrate, calcium citrate or potassium citrate. Preferably, the buffering salt is sodium citrate. The usage level of the buffering salt is subject to the specific type of buffering salt and organic acid (acidulant) to achieve the target pH level of the mixture. The purpose of maintaining a controlled pH is to prevent pre-gelling during making the pectin-based gummy mix and upon adding the acidulant in the final step. The skilled person will be able to ascertain the edible buffering salt and acidulant combinations that can be used in the formulations and methods of this disclosure, to achieve a stable pH of the final product. The selection of buffering salt and acidulant and the use amounts will depend on the desired pH and sensory properties (e.g., taste, sourness, tartness and smell) of the individual serving gummies. The skilled person will be able to know how to balance the buffering salt and acidulant amounts with these intended objectives in mind based on the teachings of the disclosure.

After the pectin, sugar and buffering salt are dissolved, a heated mixture of glucose syrup and cane sugar is incorporated into the pectin/sugar/buffering salt mixture and the resulting mixture is heated for a period of time to fully incorporate the ingredients. The mixture should continue to be heated to its boiling point for a period of time sufficient to achieve a Brix reading of about 70 to about 76 is achieved. The amount of time to heat the mixture to achieve the target Brix will depend upon the batch size. The target temperature range that should be regulated is about 100° C. to about 101° C. When the desired Brix reading is achieved, the heated mixture should be removed from the heat source. While the mixture is still hot, at least one other ingredient can be added, such as but not limited to flavors and/or colors, as further discussed below.

The heated glucose syrup (corn syrup) and sugar mixture, which is added to the pectin/sugar/buffering salt/water mixture as discussed above, is prepared by first heating glucose syrup in a separate pan to reduce the viscosity of the glucose syrup. Once the viscosity has been reduced to a workable viscosity, the heated glucose is transferred to the kettle containing pectin, to which cane sugar is also added and heated to its boiling point for a period of time sufficient to achieve a Brix reading of about 70 to about 76 is achieved. The total amount of glucose is from about 44% to about 45% of the total mixture and the total amount of cane sugar is from about 28% to about 29% of the total mixture.

The ratio of water to sugar to pectin is sufficient and necessary to achieve an ideal texture to form a gel when combining the pectin-based gummy mix and the acidulant together (e.g., part A and part B, as described herein) to make the final gelling bulk gummy mixture. The temperature of the water, sugar and pectin mixture should be controlled so that the final Brix value is controlled and the gummy mix is pasteurized. This will aid in product stability and shelf life. The temperature should be maintained at about the boiling point of the mixture, preferably at about 100° C. to about 101° C., or until the pectin has been dissolved. The pectin should be dissolved in the water, with no visual clumps or pieces of undissolved pectin.

Pectin can be used in any form, such as liquid, sheets, granulated or powder forms. Preferably, the pectin will be powdered pectin as it can be conveniently dry blended with the sugar and buffering salt (e.g., sodium citrate) before it is hydrated. To ensure a target gel strength of the final product, the water to sugar to pectin ratio to buffering salt should be about 22% to about 24% (water):about 73% to about 75% (sugar):about 1.7% to about 2.5% (pectin):about 0.10% to about 0.45% (buffering salt), with minor adjustments in the water to sugar to pectin ratio to achieve a texture that is elastic and gives a chewy mouthfeel. The ratio may also be slightly varied depending upon the flavor and color added to the pectin-based mix. Ultimately, the final texture of the individual serving gummies is achieved after demolding during the curing/drying process. More drying time leads to a firmer and chewy individual serving gummy.

Particularly preferred types of pectin are high methoxyl pectins (HM) which are slow setting. Suitable HM pectin that can be used in the products and methods of the disclosure include but are not limited to citrus and apple derived pectins.

For sugar alternatives and for reduced sugar gummies, refer to the following article: naturalproductsinsider.com/specialty-nutrients/generating-yummy-gummies; the teachings of which are incorporated herein by reference in its entirety.

The heated mixture of pectin, sugars (glucose and cane sugar) and buffering salt can be further processed to add one or more other ingredients, such as but not limited to acidulants, preservatives, flavoring agents, coloring agent, isolates, distillates, extracts, functional ingredients. Functional ingredients are those that are usually administered in a supplement form (vitamin, minerals, melatonin, L-Theanine, caffeine). It should be understood that the other ingredients will be selected based upon desired labeling of the end product gummies, such as maintaining the vegan or vegetarian status of the gummies. While one or more of these ingredients are optional in the bulk pectin-based gummy mix, the customer making the individual serving gummies from the bulk pectin-based gummy mix will need to incorporate one or more of these other ingredients into the melt to make a finished product to meet the needs of the consumer.

If one or more other ingredients are to be incorporated into the bulk pectin-based gummy mix, they should be added after the glucose/sugar mixture is added to the dissolved pectin/sugar and buffering salt mix. The timing for adding the other ingredients will depend on the nature of the ingredients and whether they are heat sensitive ingredients (e.g. natural color and flavors). Heat sensitive ingredients should be added at the end of the process to avoid extended exposure to heat. Some functional ingredients should be added to the water along with pectin to dissolve. The skilled person should be able to ascertain when is the appropriate step in the process for incorporating other ingredients. In one embodiment, the bulk gummy mix does not include other ingredients so that the end user can have the flexibility to add other ingredients of their choice. In another embodiment, the bulk gummy mix comprises at least one or more other ingredients so that the end user does not have to add those ingredients. The end user can add additional ingredients beyond those incorporated into the bulk gummy mix.

After the pectin, buffering salt and sugars have been incorporated into a mixture, the sugar content of the pectin-based gummy mix should be measured. A typical measurement for sugar content is determined by Brix. In one embodiment, the Brix measurement should be from about 70 to about 76, measured while the pectin-based mixture is hot, such as at about 80° C. to about 101° C.

The pectin-based gummy mix is then poured into a container, such as a sterilized container, and sealed for storage. It is desirable to transfer the gummy mix to a container while it is still hot, as the cooled pectin-based gummy mix is a semi-solid having a very high viscosity at room temperature. Because of its viscous nature at room temperature, the bulk gummy mix will need to be melted before the citric acid or other acidulant solution can be added to the pectin-based gummy mix during the process of making individual gummies. The bulk pectin-based gummy mix is referred to as a "melt-to-make" product because it can be melted, gelled and formed into individual serving gummies in a consistent manner in any size and dose. The bulk pectin-based gummy mix is storage stable and pasteurized.

The batch size of the gummy mix, as specified by the manufacturer, will determine the number of individual serving gummies that can be produced in a batch. The ratio of ingredients, pH and Brix should be selected to ensure that the pectin-based gummy mix is storage stable.

Method of Making a Bulk Acidulant Solution for Use in Initiating the Gelling Process The pH of the pectin-based gummy mix must be adjusted in order to initiate the gelling of the pectin-based gummy mix. In one embodiment, this is achieved with a bulk citric acid or other acidulant solution in a concentration that can be conveniently added to the bulk pectin-based gummy mix in the melted state. When the acidulant is a citric acid solution, the citric acid is provided in a concentration of from about 40% by weight to about 60% by weight in water. In a preferred embodiment, the citric acid solution is about 50% by weight in water. If an acidulant other than citric acid is used, the concentration of the solution will be from about 40% by weight to about 60% by weight in water. The use level of the bulk acidulant to be added in the pectin-based gummy mix to initiate gelling will depend upon the amount and type of buffering salt and the desired pH of the final combined mixture.

In one embodiment, a bulk citric acid or other acidulant solution can be made by dissolving citric acid or other acidulant in water at elevated temperature of from about 162° F. to about 165° F. for a period of time sufficient to dissolve the citric acid or other acidulant, such as for about 15 seconds. The citric acid or other acidulant solution is cooled and stored, for example in a sanitized container that is suitable for storage.

It is desirable to make a bulk quantity of the citric acid or other acidulant solution that would be suitable to incorporate into the bulk gummy mix melt. In one embodiment, the amount of the two components (bulk pectin-based gummy and acidulent) can be conveniently mixed together to produce a gelling mixture to make individual gummies. In another embodiment, the amount of the bulk citric acid or other acidulant solution provided is sufficient to use the solution in aliquots depending upon the amount of gummy mix portioned out from the bulk mix to produce a less than full quantity of individual gummies.

Suitable food grade edible acids that can serve as the acidulent in the products and methods of the disclosure include but are not limited to citric acid, tartaric acid, lactic acid, fumaric acid, malic acid, and other organic acids that would be known to the skilled person for the purpose of initiating the gelling process at a target pH and optionally to impart sensory or organoleptic properties, such as a tart or sour flavor, to the finished individual serving gummies.

The amount of acidulant added in the pectin gummy making process is restricted by the final pH of the pectin mix prior to depositing. In an embodiment, the amount of acidulant solution added to the pectin-based gummy melt is from about 1.2% by weight to about 2.0% by weight in the batch size to make individual gummies based on the total weight of all the components in the gummy mixture, including colors, flavors, and the acid solution, optional functional ingredients.

In another embodiment, the gummy manufacturer can prepare their own acidulant solution, such as a citric acid solution, and incorporate it into the bulk pectin-based gummy mix, using the methods described herein, to make individual serving gummies.

Storage Stable Bulk Melt-to-Make Pectin-Based Gummy Mix

The disclosure also pertains to a storage stable melt-to-make bulk pectin-based gummy mix that is a meltable precursor ingredient for making individual serving pectin gummies. The bulk pectin-based gummy mix comprises a pectin-based gummy mix comprising dissolved pectin, buffering salt, cane sugar, glucose syrup and water, and having a sugar content between about 70 to about 76 Brix, and optionally comprises flavoring and/or coloring incorporated into the pectin-based gummy mix. In one embodiment, the buffering salt is sodium citrate.

The bulk pectin-based gummy mix has a sugar level, as measured by Brix, below the target Brix level of the final gelling gummy melt. During the melting process, the Brix level of the gummy mix is increased due to evaporation of the water in the melt, to achieve the final desired Brix of the gelling gummy melt. In addition to reaching a target Brix in the melt, the gelling process is initiated by the addition of the citric acid or other acidulent solution in an amount to reach a pH of from about 3.4 to about 3.5. The melt is ready to be deposited into molds for the individual serving gummies.

The quantity of pectin-based gummy mix in a bulk package will be determined by the manufacturer and will depend upon factors including but not limited to the quantity of individual serving gummies that can be made from the bulk gummy mix, and shipping in an economic manner. In some embodiments, the pectin-based gummy mix is provided in bulk quantities from about 500 g to kilogram quantities.

In one embodiment, the bulk gummy mix does not include other ingredients so that the end user can have the flexibility to add those ingredients of their choice. In another embodiment, the bulk gummy mix comprises at least one or more other ingredients so that the end user does not have to add those ingredients. The end user can add additional ingredients beyond those incorporated into the bulk gummy mix such as but not limited to acidulants, preservatives, flavoring agents, coloring agent, isolates, distillates, extracts, functional ingredients such as but not limited to vitamins, minerals, caffeine, melatonin, plant extracts. Cannabis/CBD extracts, THC, amino acids or other extracts, L-Theanine, ascorbic acid or zinc.

While one or more other ingredients are optional in the bulk pectin-based gummy mix, the customer making the individual serving gummies from the bulk pectin-based gummy mix, made by the methods of this disclosure, will need to incorporate one or more of these ingredients into the melt to make a finished product to meet the needs of the consumer.

Examples of flavors that can be used in the products and methods of the disclosure include but are not limited to apple, grape, cranberry, pomegranate, pear, peach, pineapple, cherry, melon (watermelon, cantaloupe), plum, kiwi, mango, banana, papaya, apricot, acai, citrus fruits including but not limited to lemon, orange, grapefruit and lime; and berries including but not limited to strawberry, blackberry, boysenberry, raspberry, blueberry, currants. In preferred embodiments, the colors and flavors should be from all-natural sources.

Two-Part Pectin-Based Gummy Mix for Making Individual Serving Gummies

In some embodiments of the disclosure, the meltable and storage stable bulk pectin-based gummy mix and acidulant are provided in two separate parts as precursors for making individual serving gummies and when added together under appropriate conditions of pH and temperature will initiate the gelling process. Part A comprises a meltable and storage stable pectin-based gummy mix comprising pectin, buffering salt (e.g., sodium citrate), cane sugar, glucose syrup and water and having a sugar content of from about 70 Brix to about 76 Brix, and optionally comprising flavoring and/or coloring. Part A is referred to herein as the bulk pectin-based gummy mix and methods of making the mix are described herein.

Part B is an acidulant comprising a solution of from about 40% by weight to about 60% by weight citric acid or other acid dissolved in water. When part B is added to part A, the pectin-based gummy mix will be acidified to a pH of from about 3.4 to about 3.5, to thereby facilitate gelling of the pectin. In one embodiment, the part B acid solution will be added to part A in an amount of from about 1.2% to about 2.0%. In another embodiment, an about 50% by weight citric acid solution is added to part A in amount of about 1.2% of the total batch size to achieve a pH in the range of from about 3.4 to about 3.5. Other use levels of the citric acid solution or other acidulant are contemplated and are dependent upon variables of concentration, pH, pectin type and concentration of sugar. The amount of acid needed can vary with addition of functional ingredients, coloring, flavoring, fruit juices that affect the pH of the mixture.

In another embodiment, the disclosure provides for a kit for making individual serving pectin-based gummies from bulk quantities of ingredients in a convenient and consistently reproducible manner. In one embodiment, the kit will comprise containers separately storing part A and part B of the two-part bulk pectin-based gummy mix; and instructions for mixing part A and part B to make individual serving gummies. In another embodiment of the kit, the kit will include a container comprising part A (the pectin-based gummy mix) and instructions for making part B (citric acid or other acidulant solution) and then combining part A and part B together to make individual serving gummies. The kit can optionally include other components that could be useful in making individual serving gummies, such as but not limited to other ingredients like sanding sugar or a wax coating depending on the customers preference, functional ingredients, like L-Theanine, ascorbic acid or zinc or equipment that can aid in the manufacturing process, like gummy molds and scrapers.

The quantities of part A and optionally part B in the kits will be determined by the manufacturer and will depend upon factors including but not limited to the quantity of individual serving gummies that can be made from the bulk gummy mix, and shipping of the kits in an economic manner. Single or multiple batches of individual serving gummies can be made using the bulk pectin-based gummy mix or kits described herein, depending upon customer intended use. In one embodiment, the kit will comprise about 10 kg of part A mix and about 150 g of part B.

Methods for Making Individual Serving Gummies

The bulk pectin-based gummy mix produced by the methods of the disclosure are used as a bulk intermediate or precursor to create individual serving gummies. Because the bulk gummy mix is storage stable and meltable, it provides a convenient starting point for the gummy manufacturer to make individual serving gummies that are consistent in formulation and ingredients.

According to an embodiment, individual serving gummies are made by a method comprising melting the bulk gummy mix produced by the methods of disclosure (e.g., part A) to create a melt; optionally incorporating at least one other ingredient into the melt; acidulating the melt with a citric acid solution or other acidulant (e.g., part B as described herein), and pouring the melt into individual serving molds and allowing the melt to gel to produce individual serving gummies.

The gummy mix is melted under conditions to create a melt having a Brix from about 76 to about 80. An elevated temperature of the melt should be maintained to prevent pre-gelling upon combining part B and part A, and to allow proper depositing of the gummies in a liquid state since gelling of pectin is irreversible. In one embodiment, the melt should be maintained at about 95° C. to 100° C. (203 F.° to 212) F.°, above the gelling point of the pectin. If the Brix level is below 78, the melt should continue to be heated until the target Brix level is achieved. Evaporation of the water will cause the Brix level to continue to rise. If the Brix level is above the target range, an amount of water should be added to the melt to adjust the Brix down to the target range.

Before the target Brix range is reached, preferably less than 76 Brix, other ingredients (such as functional ingredients) can be mixed into the melt, such as using a whisk. The melt temperature should be maintained at between about 203° F. to about 212° F. The Brix level should be measured again. The target Brix should be about 78 to about 80 and adjusted as appropriate if the Brix level is not within target, as set forth herein. The melt should not exceed a Brix of about 80, otherwise the melt can pre-gel upon the addition of the acidulant (e.g., part B), causing the mixture to form clumps. This would make depositing the melt unsuitable.

The melt is then acidulated by vigorously mixing in the citric acid solution or other acidulant (e.g., part B) to achieve a pH of about 3.4 to about 3.5. At this point, the melt should be regulated at an elevated temperature of about 185° F. to about 212° F., to prevent the melt from gelling before the melt can be deposited into molds.

Once the melt is fully homogenized, the gummy melt is ready to be deposited into molds (e.g., individual serving molds). The melt will gel quickly when the temperature drops so a depositor set at a temperature of about 220° F. is a recommended way to deposit the gummy mix into individual serving gummy molds. For example, a suitable depositor will be one that has a heat jacketed hopper and heated nozzles.

The other ingredients (e.g., coloring, flavoring, functional) can be selected from least one ingredient selected from preservatives, flavoring agents, coloring agent, isolates, distillates, extracts, functional ingredients, or combination of these ingredients. The other ingredients will be selected by the manufacturer based upon customer preferences. Preferably, the other ingredients are selected to maintain vegetarian or vegan labeling of the product. Packaging of the final individual serving gummies is also determined by manufacturer and customer preferences.

In a final step of preparing individual serving gummies, the gummies are popped out of the molds and dried. Prior to drying, the individual gummies can optionally be coated with a wax to provide a shiny and appealing finish to the gummies. Waxes and methods of applying the wax are known in the field. Suitable waxes include but are not limited to Carnauba or beeswax combined with a liquid oil such as palm or sunflower. Alternatively, or in addition to waxing, the individual gummies can be sanded with sugar or other ingredients that are known to those in the field. Between waxing and sanding steps, the gummies should be allowed to dry. Ultimately, the final texture of the individual serving gummies is achieved after demolding during the curing/drying process. More drying time leads to a firmer and chewy gummy.

Definitions

As used herein, singular articles such as "a," "an" and "the," and similar referents are to be construed to cover both the singular and the plural, unless otherwise indicated herein or clearly contradicted by context.

"About" means within an acceptable error range for the particular value, as determined by one of ordinary skill in the art. Typically, an acceptable error range for a particular value depends, at least in part, on how the value is measured or determined, e.g., the limitations of the measurement system. For example, "about" can mean within an acceptable standard deviation, per the practice in the art. Alternatively, "about" can mean a range of +20%, ±10%, ±5% or ±1% of a given value. It is to be understood that the term "about" can precede any particular value specified herein.

Bulk is defined herein to mean a size and/or quantity of gummy mix packaged as a unit and offered as a precursor for making a plurality of individual serving gummies. A pectin-based gummy mix produced by the methods of the disclosure fall under the term bulk because it can be melted to make a plurality of individual serving gummies.

Gummy mix is intended to mean the melt comprising the pectin, sugar and optional finishing ingredients before it is gelled into individual serving gummies.

Individual gummies are intended to mean the molded and cured product of the method of mixing the gummy mix (e.g., part A) and an acidulant (e.g., part B). It should be understood that the methods disclosed herein produce a plurality of individual serving gummies and the number is determinant upon the amount of the gummy mix being used.

Storage stable is defined herein to mean an un-gelled pectin-based gummy mix precursor packaged under sanitary conditions. The pectin-based gummy mix should be stable (about 2 years of shelf life) when stored in the original sealed packaging under room temperature, and once opened stored at refrigerated temperature.

Precursor or intermediate are intended to be interchangeable terms and are defined herein to mean the pectin-based gummy mix in un-gelled form and the acidulant being used as bulk ingredients to be melted, molded and cured into individual serving gummies.

Individual serving size is intended to cover the final gummy product of any size or shape and consumed by an individual in an amount of 1 or multiple gummies. For example, the size of the gummy can be from about 1 gram to about 6 grams. It should be appreciated that the serving size and shape are factors determined by the gummy manufacturer based on manufacturer and customer preferences.

Brix is defined herein to mean the value on the Brix scale representing the amount of dissolved sugar solids in a liquid via its specific gravity. One-degree brix is equivalent to 1 gram of sucrose in 100 grams of solution. Brix can be measured a number of different ways, including but not limited to, brix meter, refractometer, digital density meter, hydrometer and pycnometer.

Distillate is a refined oil form of cannabinoid extract from hemp/marijuana plant, isolate refers to the pure crystals form of a specific cannabinoid, (CBD, THC, etc.). Oil-soluble and water-soluble functional ingredients can be incorporated into the gummy matrix, which include but are not limited to Cannabis/CBD extracts, THC, minerals and vitamins, amino acids, caffeine, melatonin. A preferred ingredient that can be incorporated into the bulk pectin-based gummy mix is cannabis or extract thereof. Any of these can be added to the bulk pectin-based gummy mix, for example, in an amount of extract at the request of the customer (size of the finished gummy and dosage per serving).

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A bulk, meltable and storage stable pectin-based gummy mix that is a meltable precursor for making individual serving pectin-based gummies, comprising:
   a pectin-based gummy mix comprising dissolved pectin, buffering salt, cane sugar, glucose syrup and water, and having a sugar content between about 70 to about 76 Brix, and optionally flavoring and/or coloring incorporated into the pectin-based gummy mix, wherein the pectin-based gummy mix is storage stable at room temperature and a meltable precursor for making individual serving pectin-based gummies, wherein the gummy mix is pasteurized and stored in a storage container.

2. The bulk pectin-based gummy mix of claim 1, wherein the bulk pectin-based gummy mix further comprises at least one other ingredient selected from a preservative, flavoring agent, coloring agent, isolate, distillate, extract or functional ingredient.

3. The bulk pectin-based gummy mix of claim 1, wherein the bulk pectin-based gummy mix comprises a flavoring agent, a color agent or combination thereof.

4. The bulk pectin-based gummy mix of claim 1, wherein the buffering salt is sodium citrate, sodium bicarbonate, sodium tartrate, potassium tartrate, calcium citrate or potassium citrate.

5. A method for making individual serving pectin-based gummies using a storage stable meltable bulk pectin-based gummy mix, comprising:
   heating the pectin-based gummy mix of claim 1 to a temperature to prevent pre-gelling and to solubilize the sugars in the mixture to achieve a Brix measurement of about 76 to about 80, to create a pectin-based gummy melt;
   optionally incorporating at least one other ingredient into the pectin-based gummy melt and adjusting the Brix measurement, if needed, to about 76 to about 80 Brix;
   mixing an acidulant into the heated pectin-based gummy melt to achieve a pH of from about 3.4 to about 3.5, to thereby initiate gelling of the pectin; and
   depositing the pectin-based gummy melt into individual serving molds and allowing the pectin-based gummy melt cool and gel to produce individual serving pectin-based gummies.

6. The method of claim 5, wherein at least one other ingredient, when present, is selected from a preservative, flavoring agent, coloring agent, isolate, distillate, extract or functional ingredient.

7. The method of claim 6, wherein the functional ingredient is at least one selected from Cannabis/CBD extracts, THC, minerals and vitamins, amino acids, caffeine, melatonin and extracts.

8. The method of claim 5, wherein the buffering salt is sodium citrate, sodium bicarbonate, sodium tartrate, potassium tartrate, calcium citrate or potassium citrate.

9. The method of claim 5, wherein the acidulant is a citric acid solution in a concentration of from about 40% by weight to about 60% by weight.

10. The method of claim 5, further comprising removing the individual serving pectin-based gummies from the molds and applying a coating of wax and/or sanding sugar.

11. A two-part storage stable pectin-based gummy mix as a meltable precursor for making individual serving pectin-based gummies, comprising:
    part A comprising a meltable and storage stable pectin-based mix comprising pectin, buffering salt, cane sugar, glucose syrup and water and having a sugar content of about 70 to about 76 Brix, and optionally comprising flavoring and/or coloring, wherein the pectin-based mix is pasteurized and stored in a storage container and is storage stable at room temperature: and
    part B comprising an acidulant solution comprising from about 40% by weight to about 60% by weight of an edible acidulant dissolved in water.

12. The two-part pectin-based gummy mix of claim 11, wherein the acidulant is a citric acid solution in a concentration of from about 40% by weight to about 60% by weight.

13. The two-part pectin-based gummy mix of claim 11, wherein part A further comprises at least one other ingredient selected from a preservative, flavoring agent, coloring agent, isolate, distillate, extract or functional ingredient.

14. The two-part pectin-based gummy mix of claim 11, wherein part A comprises a flavoring agent, a color agent or combination thereof.

15. A method for making individual serving pectin-based gummies from the two-part pectin-based gummy mix of claim 11, comprising:
    heating the part A pectin-based gummy mix to a temperature to prevent pre-gelling and to solubilize the sugars in the mixture to achieve a Brix measurement of about 74 to about 76, to create a pectin-based gummy melt;
    optionally incorporating at least one other ingredient into the pectin-based gummy melt and adjusting the Brix measurement, if needed, to about 76 to about 80 Brix;
    mixing the part B acidulant solution into the heated pectin-based gummy melt to achieve a pH of from about 3.4 to about 3.5, to thereby initiate gelling of the pectin; and depositing the pectin-based gummy melt into individual serving molds and allowing the pectin-based gummy melt cool and gel to produce individual serving pectin-based gummies.

16. A kit for making pectin-based individual serving gummies, comprising:
   containers separately storing part A and part B of the two-part pectin-based gummy mix of claim 11;
   instructions for mixing part A and part B to make individual serving gummies; and
   optionally comprising at least one of sanding sugar, wax, molds and scraper.

17. A method of making a storage stable bulk pectin-based gummy mix that is a meltable precursor for making individual serving pectin-based gummies, comprising:
   heating a pectin-based mixture comprising pectin, cane sugar and a buffering salt in water, for a period of time sufficient to dissolve the pectin;
   incorporating a heated mixture of glucose syrup and cane sugar into the pectin-based mixture until the sugars dissolve and the sugar content is about 70 to about 76 Brix, to produce a pectin-based gummy mix that is a storage stable meltable precursor for making individual serving pectin-based gummies;
   optionally adding flavoring and/or coloring to the pectin and sugar gummy mix before the mix is cooled; and
   pasteurizing the pectin-based gummy mix and storing the pectin-based gummy mix in a storage container; wherein the gummy mix is storage stable at room temperature.

18. The method of claim 17, further comprising incorporating into the pectin-based gummy mix at least one additional ingredient selected from a preservative, flavoring agent, coloring agent, isolate, distillate, extract or functional ingredient.

19. The method of claim 17, wherein the pectin-based gummy mix comprises a flavoring agent, a color agent or combination thereof.

20. The method of claim 17, wherein the buffering salt is sodium citrate, sodium bicarbonate, sodium tartrate, potassium tartrate, calcium citrate or potassium citrate.

* * * * *